United States Patent [19]

Causby et al.

[11] Patent Number: 4,749,217
[45] Date of Patent: Jun. 7, 1988

[54] PIPE FITTINGS

[75] Inventors: Lyall J. Causby, Banksia Park; Geoffrey P. Kastelein, Valley View, both of Australia

[73] Assignee: Bridges Corporation Pty. Ltd., Wingfield, Australia

[21] Appl. No.: 936,621

[22] Filed: Dec. 1, 1986

[30] Foreign Application Priority Data

Nov. 3, 1986 [AU] Australia ............... PH8789

[51] Int. Cl.⁴ ............................ F16L 33/02
[52] U.S. Cl. ..................... 285/245; 285/319; 285/398; 285/921
[58] Field of Search ............... 285/239, 245, 246, 247, 285/250, 255, 319, 371, 386, 398, 921

[56] References Cited

U.S. PATENT DOCUMENTS

| | | | |
|---|---|---|---|
| 178,649 | 6/1876 | Loftus | 285/245 |
| 578,983 | 3/1897 | Green | 285/245 |
| 956,077 | 4/1910 | Greenfield | 285/250 |
| 1,370,289 | 3/1921 | Crippen | 285/250 |
| 2,452,219 | 10/1948 | Bergvall et al. | 285/921 |
| 3,833,246 | 9/1974 | Wake | 285/247 |
| 4,128,264 | 12/1978 | Oldford | 285/319 |
| 4,317,471 | 3/1982 | King, Sr. | 285/319 |
| 4,451,069 | 5/1984 | Melone | 285/921 |
| 4,583,767 | 4/1986 | Hansen | 285/245 |

FOREIGN PATENT DOCUMENTS

| | | | |
|---|---|---|---|
| 141400 | 12/1949 | Australia | 285/245 |
| 151140 | 11/1951 | Australia | 285/245 |
| 153860 | 7/1953 | Australia | 285/245 |
| 547580 | 10/1985 | Australia | . |
| 548227 | 11/1985 | Australia | . |
| WO83/00206 | 1/1983 | PCT Int'l Appl. | . |
| 858607 | 1/1961 | United Kingdom | 285/245 |

Primary Examiner—Randolph A. Reese
Assistant Examiner—Anthony Knight
Attorney, Agent, or Firm—Brown, Martin, Haller & Meador

[57] ABSTRACT

A pipe fitting having an improved means of securing a polymeric pipe thereto, wherein the first part of the pipe fitting comprises a head, a tail extending downstream of the head, an annular ridge surrounding the tail downstream of the head, and a male thread between the ridge and the head. A nut arranged to engage the first part of the pipe fitting, has a number of resilient spaced fingers extending upstream from an outwardly diverging mouth. The fingers have portions of a female movement which engage the male thread to resist upstream movement of the nut, but which can disengage and slide ("ratchet") over the male thread if the nut is moved in a downstream direction.

9 Claims, 1 Drawing Sheet

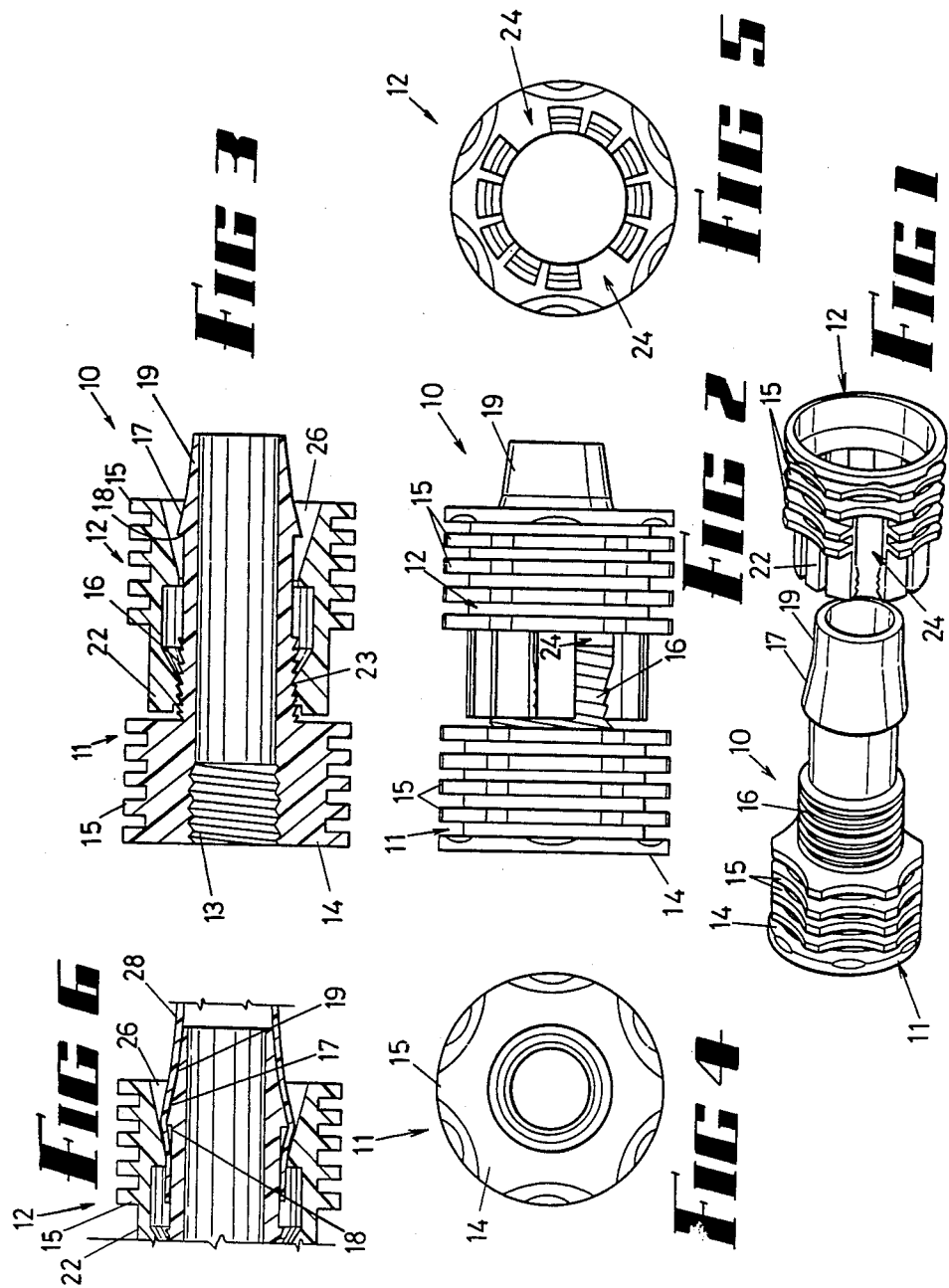

PIPE FITTINGS

This invention relates to a pipe fitting which is useful for securing to a polymeric pipe, and particularly useful for securing to a thermoplastic pipe, for example a thin walled thermoplastic pipe which can be used for trickle irrigation, a hose or other article wherein it is desired to expand the pipe or article over a ridge on the fitting and retain it against displacement due to the effects of temperature pressure or mechanical forces.

BACKGROUND OF THE INVENTION

Because of costs, use of very thin wall pipe, formed from flexible polymeric material, has become common in drip irrigation systems for the drip tubes, this thin wall pipe itself being connected to a sub-main (or a main) pipe which is often a pipe also formed from a flexible polymeric material which, except when in use, has two opposite walls contiguous with one another so that it lays flat. The drip tube is also similarly arranged, but of course much smaller in size.

PRIOR ART

There are two types of connectors which are presently employed to connect the drip tubes to the sub-mains of the main pipes of irrigation systems, the first being a connector wherein a cam or thread between a relatively fixed and relatively movable part of the fitting will urge the drip tube back towards a barbed surface of a ridge surrounding a tail on the fitting. This is subject to the disability that the drip tube frequently is inadvertently rotated, resulting in a restriction to the water passageway, and this in turn results in loss of time in a job which is essentially repetitive.

The other type of fitting which is commonly used merely slides a ring backwardly, the ring urging the end of the drip tube against the barb surface (or possibly a ramped face), but this is generally unsatisfactory in that under some conditions the interengagement is insufficient to ensure retention and the drip tube can break away. This particularly applies on a hot day when excessive pressure is applied, or the drip tube is subject to a mechanical force.

Other, but less relevant, prior art known to the includes U.S. Pat. No. 3,833,246 WAKE, Australian Pat. No. 547580 (90326/82) PLASSON, International Pat. Application No. WO 83/00206 TUCKER, Australian Pat. No. 548,227 (11725/83) KISIEL, and Australian Application No. 47528/85 FOUTS.

BRIEF SUMMARY OF THE INVENTION

With the object of providing an improvement over known prior art fittings for securing the end of a drip tube to a sub-main or main of an irrigation system, or for other purposes analogous thereto, in an embodiment of this invention a fitting comprises a head, a tail extending downstream of the head, an annular ridge surrounding the tail downstream of the head, and a male thread between the ridge and the head. A nut features anular gripping rings disopsed within it and has a number of resilient spaced fingers extending upstream from an outwardly diverging mouth, the fingers having portions of a female thread which engage the male thread to resist upstream movement of the nut, but which can slide ("ratchet") over the male thread if the nut is moved in a downstream direction.

The fitting is formed from material having some degree of resilience and yield, and after the tail has been inserted into a thin wall tube, so that the tube extends over the ridge and upstream of the barb surface, the nut can be caused to slide in a downstream direction so that the surface of its mouth end urges the thin wall tube into engagement with the barb surface of the ridge, and then by slight rotation, the nut will apply a "final clamp" against a tube. Although sliding operation can be effected with a standard form Whitworth or SAE type thread, the "final clamp" is very much more effective if the thread has a buttress (sawtooth) section.

One of the problems, as said above, is to ensure that rotation of the nut will not cause twisting of the thin wall polymeric tube, but by this invention the rotation of the nut is so small that any pipe rotation is negligible. Further, in an embodiment of this invention, the thread on both nut and head is either a single or a multi-start buttress thread which thereby does not impart any effective spreading force to the fingers. Otherwise, if a 'V' section thread were used, pressure on the thread might cause the fingers to deflect radially outwardly to a disengagement position.

Because of the repetitive nature of attaching drip tubes to a main or sub-main in an irrigation system, or to a drip or spray outlet fitting, quite often the drip tube is not positioned sufficiently far onto the tail of the main body of the fitting, and in an embodiment of this invention the nut is provided with a space between adjacent fingers which provides an immediate vision of the extent to which the drip tube has passed beyond the barb surface of the ridge on the body.

The upstream end of the body can occupy any one of a number of shapes depending upon the use to which the fitting is to be applied. It can for example comprise a female thread which is engageable over a threaded spigot of an anchor inserted into the sub-main or main. It can however alternatively be provided with an externally threaded spigot, a plug-in type connector or other fitting.

As said, the pipe fitting of this invention has a wide range of uses, but the following description relates specifically to the use of the fitting with respect to thin walled thermoplastic pipe such as is used for example for the lateral drip tubes which extend from a sub-main in a drip irrigation system.

BRIEF DESCRIPTION OF THE DRAWINGS

An embodiment of the invention is described hereunder in some further detail with reference to and is illustrated in the accompanying drawings in which FIG. 1 is an exploded perspective view of an assembly of body and nut, FIG. 2 is a side elevation of the assembly, FIG. 3 is a section corresponding to FIG. 2, FIG. 4 is an end elevation of the body of FIG. 2 but shown in third angle projection, FIG. 5 is an end elevation of a nut also shown in third angle projection, and FIG. 6 is a fragmentary enlarged section showing how the nut clamps a tube to the tail.

In this embodiment, a fitting 10 comprises a body 11 and a nut 12. The upstream end of the body 11 contains a female thread 13 by which it is securable to an anchor for a sub-main or main of an irrigation system. The upstream end also comprises a head 14 including a plurality of finger grips 15, and downstream from this the outer surface of the tail comprises a male buttress thread 16, and downstream along the tail is provided a ridge 17 the upstream end of which is a barb surface 18 and downstream end a tapered surface 19. The nut 12 also has finger grips 15, these being downstream from a plurality of circumferentially spaced fingers 22 the upstream ends of which contain a female buttress thread 23 which can engage over the male thread 16, either by sliding in a downstream direction, or rotating. The fingers are resilient for this purpose. The downstream end of nut 12 terminates in an outwardly diverging mouth surface 26. However, the mouth surface need not necessarily diverge outwardly but could comprise a generally cylindrical surface terminating in a radially inwardly directed surface at its upstream end, but this shape is not illustrated.

A pair of spaces 24 exist between fingers 22 for vision purposes.

When a drip tube 28 (FIG. 6) is positioned over ridge 17, the nut 12, which is screwed fully onto male thread 16, can be pulled back axially due to the resilience of the fingers allowing the female thread to ride over the male thread, such movement reducing the clamping space between the barb ridge and a surface of the mouth. The nut 12 is then rotated by a small angle to provide a "final clamp" force urging the tube 26 against barb surface 18.

If the body 11 is the body of an outlet fitting, such as a dripper, the words "upstream" and "downstream" in the above description should be interchanged.

We claim:

1. A pipe fitting for securing to an end of a polymeric pipe, comprising:

a body having a head and a tail, and a nut surrounding the tail, the tail extending downstream of the head and having a radially outwardly projecting ridge with a barb surface facing the head and a tapered surface downstream of the barb surface, a male thread surrounding the tail upstream of the barb surface, the nut being of resilient material and having a plurality of fingers extending in a upstream direction, the inner surfaces of said fingers comprising female thread portions engageable with said male thread, the nut having an inner surface at its downstream end defining a mouth which surrounds said ridge, and wherein a pipe clamping space is formed between said mouth and said ridge, the profiles of said thread being such that said female thread portions of said fingers are slidable over said male thread upon axial movement of the nut over the tail in a downstream direction, but resist axial movement of the nut in an upstream direction except upon nut rotation, such axial movement varying said pipe clamping space between the ridge and the mouth.

2. A pipe fitting according to claim 1 wherein said mouth surface diverges in a downstream direction.

3. A pipe fitting according to claim 1 wherein said male thread profiles are of buttress shape.

4. A pipe fitting according to claim 3 wherein said thread is a single start thread.

5. A pipe fitting according to claim 3 wherein said thread is a multi-start thread.

6. A pipe fitting according to claim 1 wherein said fingers extend in an axial direction and are circumferentially spaced from each other, at least two adjacent fingers being spaced apart sufficiently to provide a vision space of said pipe where it surrounds said tail.

7. A pipe fitting according to claim 1 wherein said head and said nut both have finger grips surrounding them.

8. A pipe fitting according to claim 1 wherein said thread comprises a female thread in its upstream end.

9. A pipe fitting according to claim 1 with annular gripping rings within the nut.

* * * * *